No. 897,507. PATENTED SEPT. 1, 1908.
E. F. W. ALEXANDERSON.
SYNCHRONOUS MOTOR.
APPLICATION FILED MAY 5, 1905.
2 SHEETS—SHEET 1.
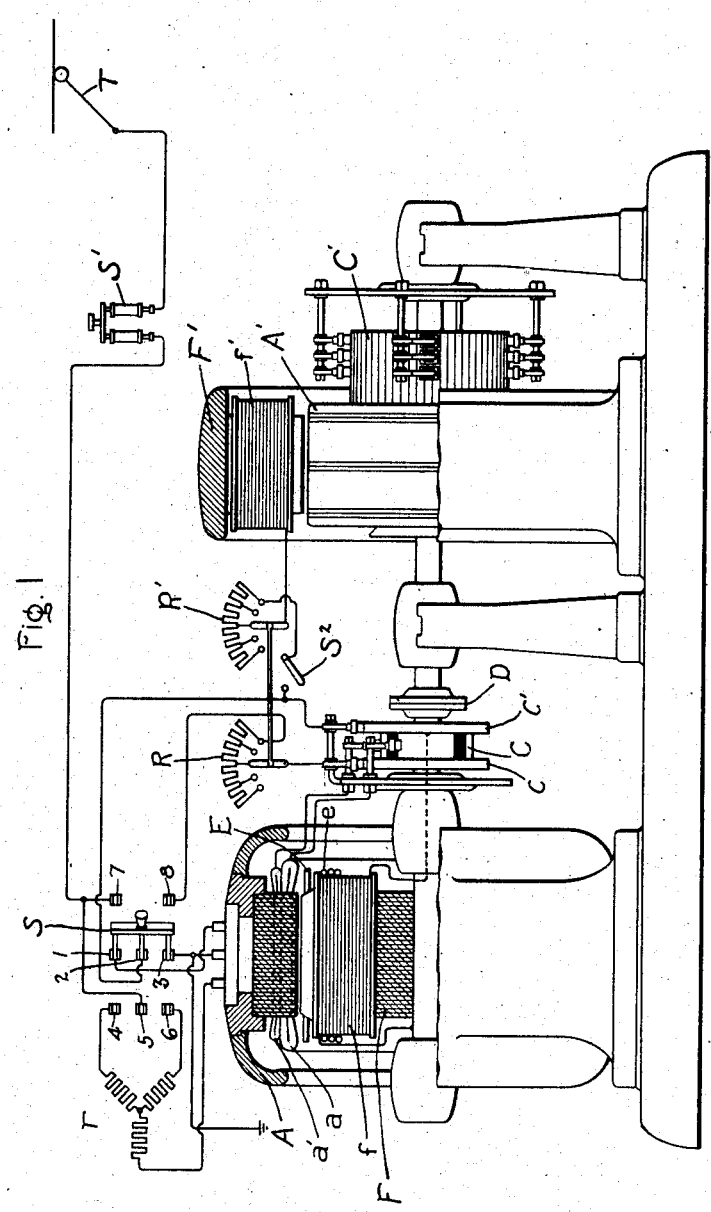
Witnesses.
Lloyd C. Bush
Helen Oxford
Inventor.
Ernst F. W. Alexanderson.
by Albert G. Davis
Att'y.

No. 897,507. PATENTED SEPT. 1, 1908.
E. F. W. ALEXANDERSON.
SYNCHRONOUS MOTOR.
APPLICATION FILED MAY 5, 1905.
2 SHEETS—SHEET 2.
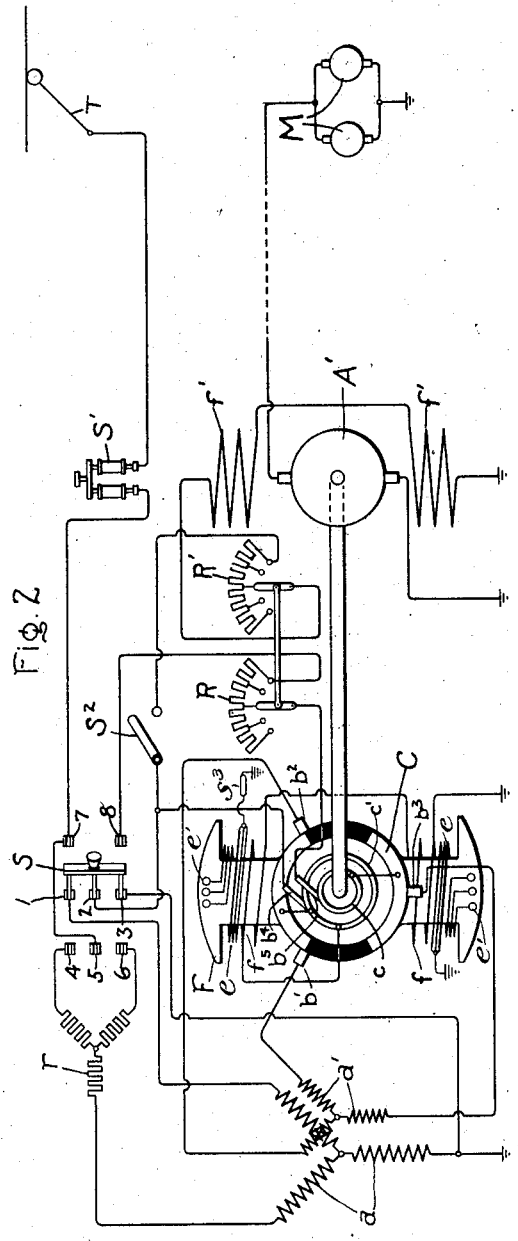
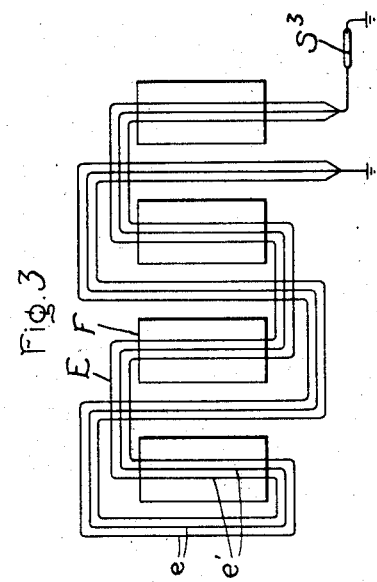
Witnesses.
Lloyd C. Bush
Arlen Axford
Inventor.
Ernst F. W. Alexanderson
by Albert G. Davis
Att'y

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SYNCHRONOUS MOTOR.

No. 897,507.     Specification of Letters Patent.     Patented Sept. 1, 1908.

Application filed May 5, 1905. Serial No. 259,065.

*To all whom it may concern:*

Be it known that I, ERNST F. W. ALEXANDERSON, a subject of the King of Norway and Sweden, residing at Schenectady, county of Schenectady, State of New York, have invented certain new and useful Improvements in Synchronous Motors, of which the following is a specification.

My invention relates to alternating-current synchronous motors, and is particularly applicable to single-phase motors; though in some of its features it is not limited to motors of any particular number of phases.

One object of my invention is to provide a simple and efficient form of single-phase motor which shall be self-starting.

It has been customary heretofore to start polyphase synchronous motors by connecting the armature to a polyphase source of current and short-circuiting the field winding. A rotating field is thereby produced in the armature, which acts upon the field structure short-circuited to start the machine. Obviously, such an arrangement is not applicable to a motor supplied from a single-phase source, since no rotary field and no torque would be produced if the armature were connected to the source at starting.

One feature of my invention consists in providing the field of a synchronous motor with de-phasing or phase-splitting means, so that if the field is connected to a single-phase source a rotary field will be produced, and if a winding on the armature is short-circuited, the motor will possess a starting torque. More specifically stated, this feature of my invention consists in providing the field of a synchronous motor with conductors in inductive relation to the field coils and with a second set of conductors displaced from the field coils and connected to the first-named conductors. The first-named conductors then act as a secondary for the field winding and supply an induced current to the second set of conductors. The second set of conductors are thus traversed by a current displaced both in time and in space from the current in the field coils, and a rotary field and consequent starting torque are produced. By thus connecting the field winding to the source at starting I avoid the high voltages which are induced in the field winding when starting by connecting the armature to the source.

A further feature of my invention consists in so arranging the armature winding that it may be connected as a polyphase winding when short-circuited for starting so as to give a better starting torque, and may then be connected as a single-phase winding to the source.

A self-starting single-phase synchronous motor arranged in accordance with my invention finds a useful application in vehicles deriving their motive power from a motor-generator set comprising an alternating-current motor supplied from the line and a direct-current generator supplying the driving motors. For such a purpose, a single-phase motor is particularly desirable, since the arrangement of supply conductors and collectors is much simpler with a single-phase than with a polyphase motor. And by the use of a motor arranged in accordance with my invention a single-phase source of supply may be employed without the necessity of providing auxiliary means for starting the synchronous motor.

One simple and efficient method of controlling the motors supplied from a motor generator set consists in varying the field excitation of the generator so as to vary the voltage supplied to the motors. In order to obtain a control over a wide range with this method it is essential that the generator should be separately excited.

One feature of my invention consists in the combination with a synchronous motor and a generator driven thereby, of a rectifying commutator connected to a suitable source of alternating-current and supplying the field windings of both motor and generator. By this arrangement, the use of an auxiliary exciter is dispensed with.

It is well understood in the art that an alternating-current motor operates most efficiently with unity power factor, that the power factor of a synchronous motor can be controlled by varying the field excitation, and that to obtain unity power factor under varying load it is necessary to vary the field excitation to a certain extent with varying load. In the case of a motor generator set of the type above described, the load on the generator, and consequently on the motor, depends upon the field excitation of the generator.

One feature of my invention consists in providing means for simultaneously varying the field excitations of both motor and generator, so that when the field of the generator is varied to vary the load, the field excitation of the motor is varied the proper amount to maintain the motor in operation at unity power factor, or to give a leading current on heavy loads if desired.

My invention will best be understood by reference to the accompanying drawings, in which Figure 1 shows a side elevation, partly in cross-section, of a motor generator set comprising a synchronous motor arranged in accordance with my invention; Fig. 2 is a diagram of the circuit connections; and Fig. 3 shows a diagrammatical development on a plane surface of the phase-splitting means for starting the motor.

In the drawings, A represents the armature structure of a single-phase synchronous motor carrying the armature coils $a$ distributed around the inner periphery of the armature in the usual manner.

$a'$ represents a polyphase auxiliary exciting winding furnishing the excitation for the fields of both motor and generator, as will be hereinafter explained.

F represents the field structure, which is arranged in the usual manner, with polar projections carrying the field coils $f$.

E represents the phase-splitting means carried by the field structure, which, as shown in the drawings, may consist of one or more conductors $e$ surrounding the field poles and consequently in inductive relation to the field coils, and a second conductor or set of conductors $e'$ connected in circuit with the first conductors, and extending across the pole-faces, i. e., displaced 90 electrical degrees with respect to the field coils.

When the field winding is connected to a source of single-phase current, as will be hereinafter explained, an electromotive force is induced in the conductors $e$, which produces a current in the conductors $e'$, which is displaced both in time and in space from the current in the field coils, and which, coacting with that current, produces a rotary field.

$r$ represents a starting resistance through which the armature winding is short-circuited at the start.

S represents a double-throw switch arranged in one position to establish the proper conditions for starting the motor, and in the other position to establish the proper running connections.

S' represents a switch connecting the starting switch to the source of single-phase current, as indicated by trolley T.

A' represents the armature of a direct-current generator, the shaft of which is connected to the shaft carrying the motor field through a suitable coupling D.

C' represents the commutator of the generator, F' represents the field structure, and $f'$ the field coils of the generator arranged in the usual manner.

C represents a rectifying commutator, and $c\ c'$ represent a pair of slip-rings carried on the motor shaft. The auxiliary exciting winding $a'$ of the motor is connected to the field windings of the two machines through the rectifying commutator and slip-rings, and the field rheostats R and R'.

The electrical connections are shown in Fig. 2. With the switch S thrown to the left in Fig. 2, the following circuits are established: From the trolley T the single-phase current passes through the switch S' to contact 5 of switch S, contact 2, brush $b^4$, collector-ring $c'$, through the field coils $f$ to ground. The single-phase current thus passes through the field winding and induces a current in the phase-splitting winding E, which produces a rotary field in the manner heretofore explained. The armature winding $a$, which is arranged as a polyphase winding (shown in the figure as a Y-connected three-phase winding), is short-circuited through the starting resistance $r$. One terminal of the winding is connected directly to one terminal of the resistance, while the other terminals of the winding are connected to the resistance through the switch-contacts 1 and 4, and 3 and 6, respectively. The armature is thus connected as a short-circuited polyphase winding, acting as a secondary for the rotary field produced in the field structure and coacting therewith to produce the starting torque of the motor.

When the motor is up to speed, switch S is thrown over to the right, and the switch $S^2$ is closed. The following circuits are thus established: From trolley T the single-phase current passes through switch S', through switch contacts 7 and 1, to one terminal of the armature winding A, through the winding to ground. One phase of the three-phase winding is thus idle while the motor is running, the other two phases acting as a single-phase winding. The auxiliary exciting winding $a'$, which is also shown as a Y-connected three-phase winding, has its terminals connected to three brushes $b^1$, $b^2$ and $b^3$ arranged on the commutator C. This arrangement of commutator and brushes I have described in a former patent No. 789,476, issued to me May 9, 1905. Briefly described, it consists of a commutator having one segment per pole of the machine, and a polyphase arrangement of brushes bearing thereon and connected to a source of polyphase excitation. The commutator segments are each of a length substantially equal to the distance between adjacent brushes so that as a segment leaves one brush it engages a second brush. With this arrangement a rectified potential is impressed upon the commutator segments through the brushes.

With the rectifying commutator in the position shown, the exciting circuits are as follows: From the lower terminal of the exciting winding $a'$, the current passes to brush $b^3$ to commutator C, to collector ring $c$, brush $b^5$, field rheostat R, switch contact 8, switch contact 3, through ground connection, to the lower terminal of field winding $f$, through the field winding, to collector ring $c'$, to commutator C, and through brushes $b^1$ and $b^2$ in parallel to the two upper terminals of auxiliary field $a'$. A circuit is also closed as follows: from the lower terminal of auxiliary winding $a'$, brush $b^3$, commutator C, collector ring $c$, brush $b^5$, field rheostat R, switch contacts 8 and 3, through ground connection, to the lower terminal of field winding $f'$, through rheostat R', through switch $S^2$, brush $b^4$, collector ring $c'$, commutator C, and through brushes $b^1$ and $b^2$ in parallel to the upper terminals of the auxiliary winding $a'$. Thus, the auxiliary winding is connected through the rectifying commutator to the fields of both motor and generator, the field rheostat R is in series with the motor field, and both rheostats R and R' are in series with the generator and field. The arms of the two rheostats are fastened together, as shown in the drawings, so that when resistance is cut out from the generator field, a certain smaller amount of resistance is also cut out from the motor field, so as to maintain the proper field excitation in the motor for unity power factor for all loads, or for producing a leading current for heavy loads, if desired. The armature A' of the generator is shown connected to motors M. Varying the field strength of the generator consequently controls the speed and torque of the motors.

In Fig. 3 the phase-splitting winding is shown with the switch $S^3$ in circuit therewith. By means of this switch the phase-splitting winding E may be open-circuited when the motor is up to speed, or the switch $S^3$ may be omitted and the winding E left short-circuited on itself, so as to act as a damping winding to hold the motor in synchronism or to help pull it back into synchronism if it should fall out of step.

It will be seen from the foregoing that my invention comprises a number of features. While I prefer to use them together, they may with advantage be used separately, and I desire to claim them whether used together or not. Furthermore, I do not desire to limit myself to the particular construction and arrangement of parts here shown, but aim in the appended claims to cover all modifications which are within the scope of my invention.

What I claim as new, and desire to secure by Letters Patent of the United States, is,—

1. In combination with a source of alternating-current, a synchronous motor having a field provided with phase-splitting means, means for connecting the field winding to said source and for short-circuiting said armature winding to start the motor, and means for connecting said armature winding to said source and for supplying direct-current to the field winding when the motor is up to speed.

2. In an alternating-current synchronous motor, conductors in inductive relation to the field winding, conductors displaced from the field winding and connected to the first named conductors, means for connecting the field winding to the source of alternating-current and short-circuiting the armature winding to start the motor, and means for connecting the armature winding to said source and for supplying direct-current to the field winding when the motor is up to speed.

3. In combination with a source of single-phase current, a synchronous motor having a field provided with phase-splitting means and an armature winding arranged for connection as a polyphase winding, means for connecting the field winding to said source and for short-circuiting said armature as a polyphase winding through a starting resistance, and means for connecting said armature winding to said single-phase source and for supplying direct-current to the field winding.

4. In combination with a source of single-phase current, a synchronous motor having a field provided with phase-splitting means and a polyphase armature winding, means for connecting the field winding to said source and short-circuiting all the phases of the armature winding through a resistance at starting, and means for connecting two terminals of said armature windings to said source and supplying direct-current to the field winding when the motor is up to speed.

5. In combination with a source of single-phase current, a synchronous motor having an armature winding arranged for polyphase connection and a field provided with conductors in inductive relation to the field coils and other conductors displaced therefrom and in series therewith, means for connecting the field winding to said source and short-circuiting said armature winding as a polyphase winding through a resistance at starting, and means for connecting the armature winding to said source and supplying direct current to said field winding when the motor is up to speed.

6. In a synchronous motor, a field structure having projecting poles, field coils carried on said poles, conductors surrounding said poles, conductors extending across the faces of said poles and connected in series with the first-named conductors, and means for supplying alternating-current to the field coils and for short-circuiting the armature to start the motor.

7. In a synchronous motor, a main armature winding, an auxiliary winding, a field provided with phase-splitting means and with a rectifying commutator, means for supplying alternating-current directly to the field winding and short-circuiting the main armature winding to start the motor, and means for supplying alternating-current to the main armature winding and for connecting the field winding to the auxiliary winding through the rectifying commutator when the motor is up to speed.

8. In a synchronous motor, a field provided with phase-splitting means and a rectifying commutator, means for supplying alternating-current directly to the field winding and for short-circuiting the armature to start the motor, and means for supplying rectified current to the field winding through said commutator and for supplying alternating-current to the armature winding when the motor is up to speed.

9. A self-exciting synchronous alternating-current motor having its field member provided with a field winding, with a rectifying commutator and with phase-splitting means, in combination with means for opening the circuit of the commutator and connecting the field winding with a source of single-phase current at starting.

10. A self-exciting synchronous alternating-current motor having its field member provided with a field winding, with a rectifying commutator and with conductors displaced from the field winding connected in circuit with other conductors inductively related to the field winding, in combination with means for opening the circuit of the commutator and connecting the field winding to a source of single-phase current at starting.

11. A self-exciting synchronous alternating-current motor having its field member provided with a field winding and with a rectifying commutator and brushes, said winding being arranged to be connected through said rectifying commutator and brushes to a source of polyphase excitation, phase-splitting means mounted on said field member, and means for opening the circuit of the commutator and connecting the field winding to a source of single-phase current at starting.

12. In a self-exciting synchronous motor, a field provided with phase-splitting means for starting, a rectifying commutator, and a polyphase auxiliary exciting winding carried by the armature.

13. In combination, a synchronous motor, a generator driven thereby, a rectifying commutator provided with a polyphase arrangement of brushes bearing thereon, means for supplying polyphase-current to said brushes, and connections from said commutator to the field windings of both motor and generator.

14. In combination, a synchronous motor, a generator driven thereby, a rectifying commutator, and an auxiliary exciting winding carried by the motor armature and connected through said commutator to the field windings of both motor and generator.

15. In combination, a synchronous motor, a generator driven thereby, a rectifying commutator provided with a polyphase arrangement of brushes bearing thereon, a polyphase auxiliary exciting winding carried by the motor armature and connected to said brushes, and connections from said commutator to the field windings of both motor and generator.

16. In combination, a synchronous motor, a generator driven thereby, and means for varying simultaneously but by unequal amounts the field strengths of both machines.

17. In combination, a synchronous motor, a generator driven thereby, resistances in the field circuits of said machines, and means for varying simultaneously the resistances in both field circuits.

18. In combination, a synchronous motor, a generator driven thereby, a rectifying commutator, means for supplying alternating-current thereto, connections from said commutator to the field winding of both machines, and means for varying simultaneously but by unequal amounts the field strengths of both machines.

19. In combination, a synchronous motor, a generator driven thereby, a rectifying commutator, an auxiliary exciting winding carried by the motor armature and connected through said commutator to the field windings of both machines, resistances in both field circuits, and means for varying simultaneously the resistance in both circuits.

In witness whereof I have hereunto set my hand this 4th day of May, 1905.

ERNST F. W. ALEXANDERSON.

Witnesses:
BENJAMIN B. HULL,
HELEN ORFORD.